(12) United States Patent
Imai

(10) Patent No.: US 7,914,102 B2
(45) Date of Patent: Mar. 29, 2011

(54) IMAGE FORMING APPARATUS AND CONTROL METHOD THEREOF

(75) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 11/947,014

(22) Filed: Nov. 29, 2007

(65) Prior Publication Data
US 2008/0158280 A1 Jul. 3, 2008

(30) Foreign Application Priority Data
Dec. 27, 2006 (JP) ................. 2006-353179

(51) Int. Cl.
*B41J 29/393* (2006.01)
(52) U.S. Cl. .............. 347/19; 358/1.2; 347/15
(58) Field of Classification Search .............. 347/15, 347/43, 41, 19, 12; 358/1.2, 1.9
See application file for complete search history.

(56) References Cited

U.S. PATENT DOCUMENTS

| | | | |
|---|---|---|---|
| 7,168,776 B2 * | 1/2007 | Mitsuzawa | 347/15 |
| 7,275,806 B2 * | 10/2007 | Matsuzawa et al. | 347/43 |
| 7,303,247 B2 * | 12/2007 | Maru et al. | 347/15 |

FOREIGN PATENT DOCUMENTS

| | | | |
|---|---|---|---|
| JP | 2001200183 A | | 7/2001 |
| JP | 2001323192 A | | 11/2001 |
| JP | 2005297212 A | | 10/2005 |

* cited by examiner

*Primary Examiner* — Lamson D Nguyen
(74) *Attorney, Agent, or Firm* — Fitzpatrick, Cella, Harper & Scinto

(57) ABSTRACT

In multipass printing, a mask pattern which increases the degree of dot dispersion in each pass is used for a combination of inks for increasing glossiness when printing an image. Contrary, a mask pattern which decreases the degree of dot dispersion in each pass is used for a combination of inks for decreasing glossiness. Thus, an entire image can be made uniformly glossy by suppressing gloss unevenness within the image.

11 Claims, 7 Drawing Sheets

F I G. 3
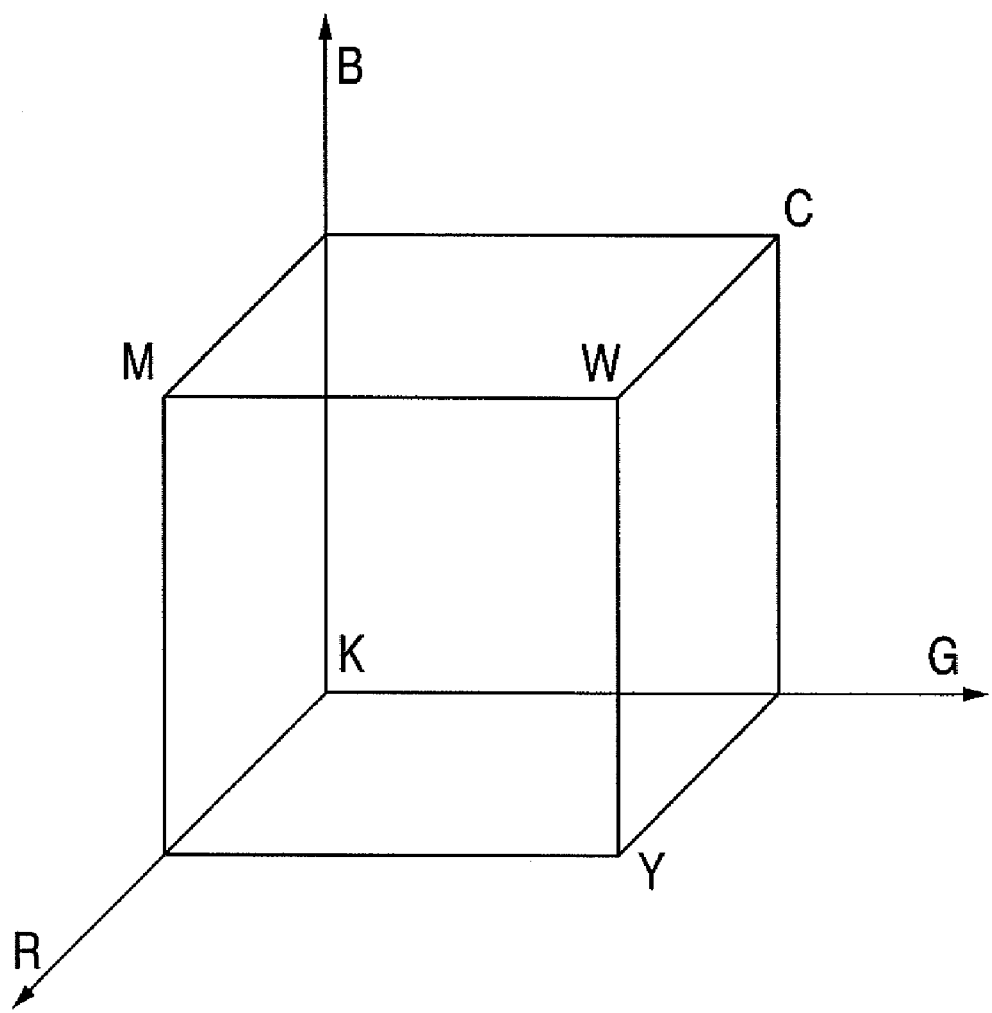

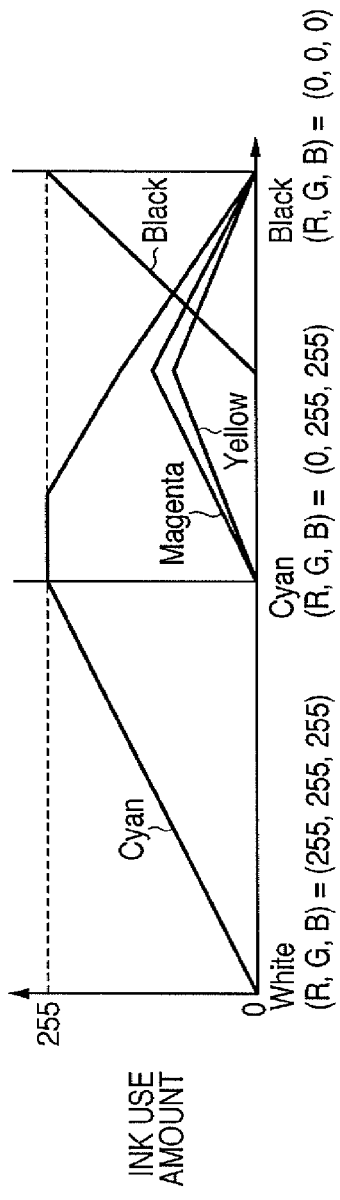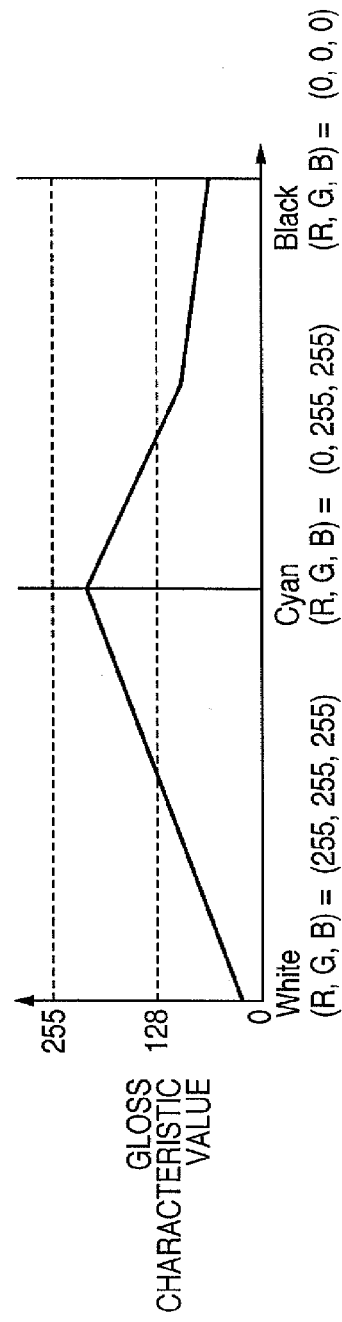
F I G. 4
F I G. 5

IMAGE FORMING APPARATUS AND CONTROL METHOD THEREOF

BACKGROUND OF THE INVENTION

1. Field of the Invention

The present invention relates to an image forming apparatus and control method thereof and, more particularly, to an image forming apparatus which prints an image by an inkjet method, and a control method thereof.

2. Description of the Related Art

With regard to most inks conventionally used to print an image by an inkjet method, a dye which easily dissolves in water serving as a main component is adapted as a color material. The color materials of most the dye inks easily penetrate into a print medium together with water. Even when an image is printed on a glossy medium with a smooth surface, the color material penetrates into the medium, maintaining the smoothness of the medium surface and obtaining a highly glossy printed material. Technical problems when forming a glossy image have been solved by improving print media.

Recently, demands arise for further improvement of light resistance and water resistance of printed materials. To meet these demands, ink which adopts a pigment as a color material is being developed. In general, however, the color materials of most pigment inks do not satisfactorily penetrate into a print medium. The fixing characteristic or glossiness of a print medium has room for improvement.

The fixing characteristic can be improved to a certain extent by employing, e.g., multipass printing. A technique of improving the fixing characteristic by multipass printing will be described.

FIG. 1 is a schematic view for explaining multipass printing. Multipass printing is generally adopted in a serial inkjet printing apparatus. Multipass printing is to form an image stepwise by multiple print scans in the same image region of a print medium.

In FIG. 1, reference numeral 201 denotes a state of a print medium after the first print scan. "1A" represents a dot landed by the first print scan. In this example, dots 1A are printed without overlapping each other. Reference numeral 202 denotes a state of the print medium after the second print scan. "2A" represents a dot landed by the second print scan. Similarly, reference numeral 203 denotes a state of the print medium after the third print scan; and 204, a state of the print medium after the fourth print scan. "3A" and "4A" represent dots landed by the third and fourth print scans, respectively. Printing in the same image region is complete by the four print scans represented by the states 201 to 204. Positions printable by the respective print scans are determined by AND processing using print data and binary data called a mask pattern, and the like.

In multipass printing, since a print medium is conveyed between print scans, and ink droplets are applied to the print medium with a predetermined time difference. Printing can progress while applied ink droplets dry even on a print medium whose pigment ink absorption speed is low, such as plain paper. This results in a good fixing characteristic.

Since a print medium is conveyed between print scans, different printing elements print in the same image region in the respective print scans. Even if discharge from each printing element varies, the variations can be distributed and made less conspicuous. At the boundary between print scans, so-called white streak or black streak may appear owing to variations in the amount of conveyance. Multipass printing can make such a streak unnoticeable. Discharge variations of each printing element and variations in the amount of conveyance are image degradation factors which are inevitable owing to the manufacturing process and precision. Hence, the above-described multipass printing is an important printing technique for maintaining the image quality by a serial inkjet printing apparatus, and is popularly employed.

However, the glossiness of a printed portion may be impaired when performing multipass printing on a print medium whose surface has undergone special processing, such as glossy paper.

Generally, a print medium such as glossy paper has small pores in the surface to absorb an ink solvent and improve the fixing characteristic of a color material. A print medium can absorb the dye of dye ink via pores together with water. However, the pigment molecules of pigment ink hardly dissolve in water, and disperse as fine particles in water. Since the fine particle is larger than the pore on the medium surface, the color material hardly penetrates into the print medium. In other words, the fine particles of pigment are deposited and fixed on the surface of the print medium. As a result, the smoothness of the surface of the print medium is impaired, losing glossiness.

When multipass printing uses pigment ink whose color material hardly penetrates into a print medium, dots applied by print scans sequentially dry on a print medium, overlap each other, and are fixed. In four times multipass printing shown in FIG. 1, four ink layers overlap each other. Contrary, when an entire image is complete by one print scan without adopting multipass printing, only one ink layer exists. For this reason, the surface of a print medium becomes rough and readily loses glossiness in a case where multipass printing is employed, compared to a case where no multipass printing is employed.

To solve these problems, several solutions are proposed. For example, there is disclosed a technique for improving glossiness by applying ink to a print medium and fixing it by a heat roller (see, e.g., Japanese Patent Laid-Open No. 2001-200183).

There is also disclosed a technique for preparing pigment ink containing a photosetting monomer or oligomer, applying the ink to a print medium, and irradiating the print medium with ultraviolet light or the like to set the ink (see, e.g., Japanese Patent Laid-Open No. 2001-323192). According to this technique, a resin film is formed on the ink surface upon irradiation with ultraviolet light or the like, and improves surface smoothness and glossiness.

However, to implement the above-mentioned fixing by a heat roller and ultraviolet irradiation, the printing apparatus requires a component such as a heat roller for heating a print material or a light-emitting means for emitting ultraviolet light or the like. This raises the cost of the printing apparatus and complicates the image forming process.

To solve this, there is disclosed a technique for obtaining glossiness suitable for each print medium by selecting the number of passes or a mask pattern in accordance with the glossiness of a print medium in an inkjet printing apparatus using pigment ink (see, e.g., Japanese Patent Laid-Open No. 2005-297212). According to this technique, satisfactory glossiness can be maintained without performing post-processing such as fixing by a heat roller or ultraviolet irradiation, and without impairing the glossiness of a printed portion on a glossy print medium as much as possible (see, e.g., Japanese Patent Laid-Open No. 2005-297212).

However, the technique described in Japanese Patent Laid-Open No. 2005-297212 aims at improving the glossiness of a formed image. It is, therefore, difficult to obtain uniform glossy of an entire image owing to a gloss characteristic unique to each ink and the shape difference in fixing. This technique cannot suppress so-called gloss unevenness.

SUMMARY OF THE INVENTION

The present invention has been made to overcome the conventional drawbacks, and has as its object to provide an image forming apparatus having the following functions, and a control method thereof. More specifically, the present invention suppresses gloss unevenness and obtains uniform glossy of an entire image when an image is formed on a glossy print medium with pigment ink by inkjet printing.

According to one aspect of the present invention, there is provided an image forming apparatus comprises:

an acquisition unit adapted to acquire a gloss characteristic value corresponding to a colorant used to print a target image;

a determination unit adapted to determine a degree of dispersion of dots in printing the target image on the basis of the gloss characteristic value and a target gloss value; and an image forming unit adapted to print the target image on the basis of the degree of dispersion determined by the determination unit.

According to another aspect of the present invention, there is provided a method of controlling an image forming apparatus, the method comprises:

an acquisition step of acquiring a gloss characteristic value corresponding to a colorant used to print a target image;

a determination step of determining a degree of dispersion of dots in printing the target image on the basis of the gloss characteristic value and a target gloss value; and an image forming step of printing the target image on the basis of the degree of dispersion determined in the determination step.

Further features of the present invention will become apparent from the following description of exemplary embodiments with reference to the attached drawings.

BRIEF DESCRIPTION OF THE DRAWINGS

FIG. 3 is a view showing the concept of a 3D LUT looked up in color separation in the embodiment;

FIG. 4 is a graph showing the amount of use of each color ink in the embodiment;

FIG. 5 is a graph showing the gloss characteristic value of the cyan hue in the embodiment;

FIG. 7A is a sectional view showing an ink deposition state on a print medium by printing using the mask pattern a;

DESCRIPTION OF THE EMBODIMENTS

The present invention will be described in detail on the basis of preferred embodiments with reference to the accompanying drawings. Arrangements set forth in the following embodiments are merely examples, and the present invention is not limited to illustrated arrangements.

First Embodiment

Outline of Printing System

Figure 1:
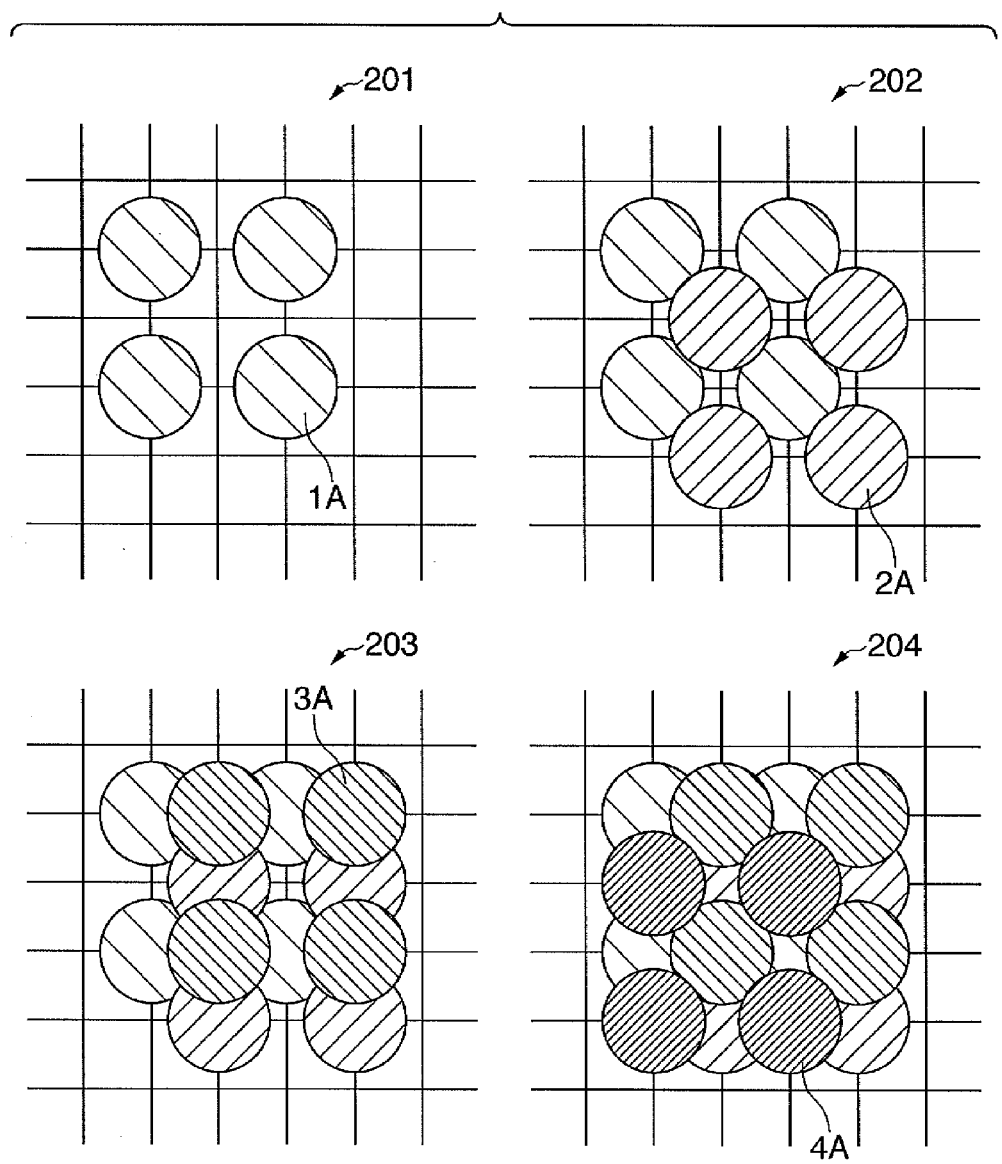
FIG. 1 is a schematic view for explaining general multipass printing.
Figure 2:
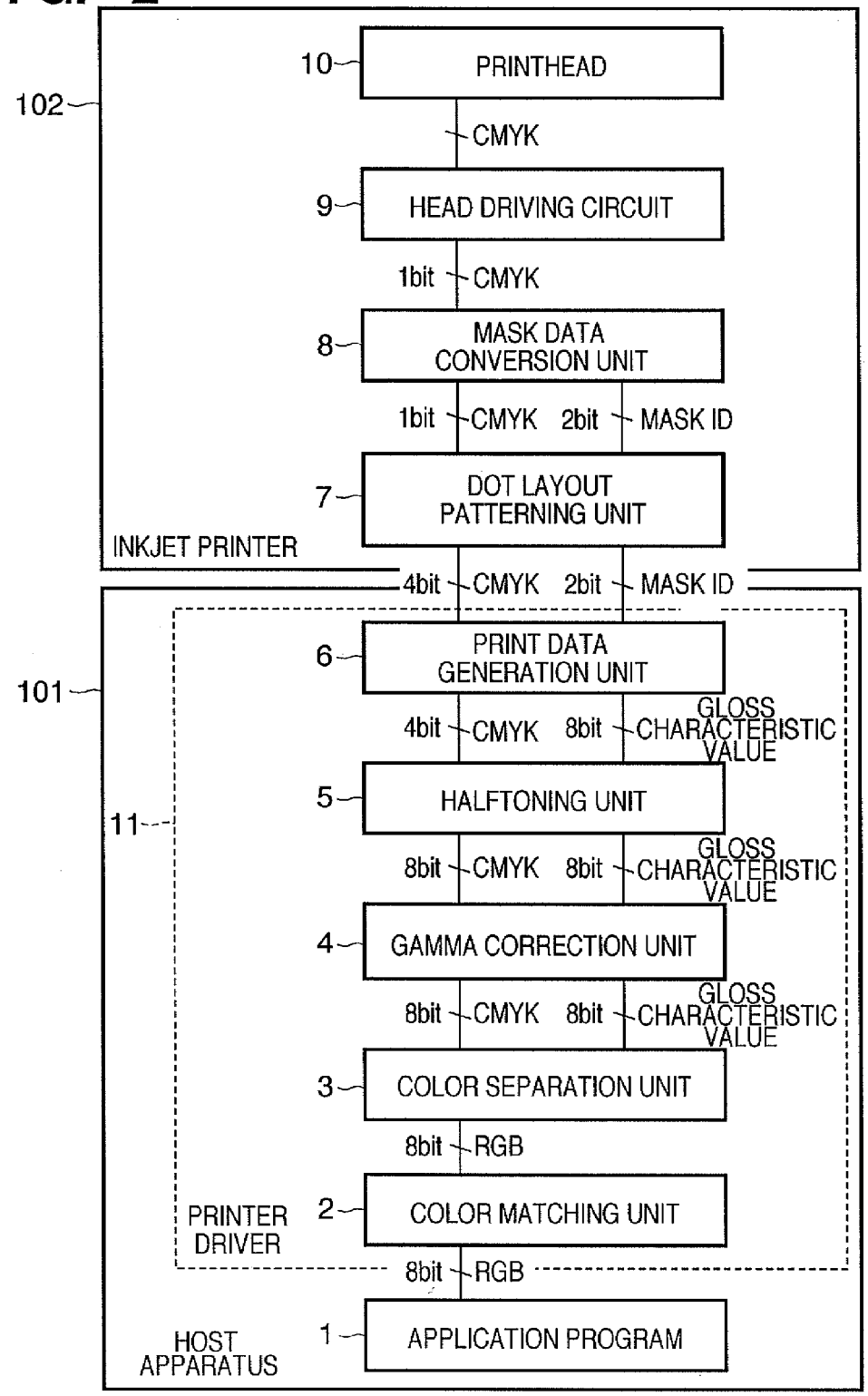
FIG. 2 is a block diagram showing a configuration of a printing system in an embodiment according to the present invention.

FIG. 2 is a block diagram showing a configuration of a printing system to which the first embodiment is applied. This system comprises an inkjet printer 102 serving as a printing apparatus, and a host apparatus (computer or image processing apparatus) 101. The inkjet printer 102 (to be referred to as a printer 102 hereinafter) prints with inks in four colors, cyan (C), magenta (M), yellow (Y), and black (K).

Firstly, processing in the host apparatus 101 will be explained. An application program 1 and printer driver 11 run on the operating system (OS) of the host apparatus 101. The application program 1 creates and edits image data to be printed by the printer 102.

The host apparatus 101 can receive image data via a variety of media. For example, JPEG image data captured by a digital camera may also be input via a memory card. TIFF image data scanned by a scanner or image data recorded on a CD-ROM may also be input. It is also possible to input image data downloaded from a server or Web site on a network such as the Internet.

The host apparatus 101 displays input image data on a monitor (not shown). While checking the monitor display, the user of the host apparatus 101 edits and processes image data via the application program 1, and instructs the application program 1 to print. In response to the print instruction, the application program 1 (or OS) converts image data into, e.g., sRGB image data (8-bits for each color), and transfers the sRGB image data to the printer driver 11.

In the printer driver 11, a color matching unit 2 performs color gamut mapping processing for input image data. More specifically, the color matching unit 2 converts sRGB data into RGB data in printer color gamut by interpolation operation and a three-dimensional LUT (3D LUT) representing the relationship between a color gamut reproduced by sRGB image data and a color gamut (the printer color gamut) reproducible by the printer 102.

A color separation unit 3 obtains color-separated data (C, M, Y, and K each for 8 bits) which reproduce colors represented by R, G, and B data after color gamut mapping and correspond to a combination of inks. The color separation processing is done using both the 3D LUT and interpolation operation, similar to the color gamut mapping processing. Together with color-separated data, the 3D LUT stores 8-bit data representing a gloss characteristic corresponding to a combination of color materials. A gloss characteristic value corresponding to R, C, and B data is obtained by interpolation operation, similar to color-separated data. That is, five 8-bit data representing C, M, Y, and K values and a gloss characteristic value are stored in the color separation 3D LUT for color separation in the first embodiment, and read out via interpolation operation in accordance with input R, G, and B values. Details of the color separation processing will be described later.

A gamma correction unit 4 performs gamma correction to convert the tone value of each color of color-separated data obtained by the color separation unit 3. More specifically, the gamma correction unit 4 performs conversion processing so as that the color-separated data corresponds to the tone characteristic of the printer 102 by using a one-dimensional LUT (1D LUT) corresponding to the tone characteristics of respective color inks used in the printer 102.

A halftoning unit 5 executes so-called quantization to convert each of C, M, Y, and K 8-bit color-separated data into 4-bit data by error diffusion method. The printer 102 refers to the 4-bit data as an index representing a dot layout pattern.

A print data generation unit 6 creates print data by adding print control information to the 4-bit index data. The print data generation unit 6 selects, for each pixel, a mask pattern used by a mask data conversion unit 8 in the printer 102 on the basis of print conditions input from the application program 1 and the 8-bit gloss characteristic value obtained by the color separation unit 3. The selected mask pattern information is added to print control information as 2-bit data representing an ID number for identifying a mask pattern. The resultant data is transmitted as print data to the printer 102. Details of processing by the print data generation unit 6 will be described later.

These processes by the application program 1 and printer driver 11 are implemented by executing the corresponding programs by a CPU (not shown). These programs are loaded from a ROM or hard disk to a RAM (none of them is shown), and executed. In executing the programs, the RAM is used as the work area of the CPU.

Processing in the printer 102 will be explained. The printer 102 performs dot layout patterning processing and mask data conversion processing for print data input from the host apparatus 101.

A dot layout patterning unit 7 lays out dots in accordance with a dot layout pattern corresponding to 4-bit index data (tone value information) for each pixel of an actual print image. That is, the dot layout patterning unit 7 assigns, to each pixel represented by 4-bit data, a dot layout pattern corresponding to the tone value of the pixel. The dot layout patterning unit 7 defines the ON/OFF states of dots in a plurality of areas within the pixel, and lays out discharge data "1" or "0" in each area.

The mask data conversion unit 8 performs mask processing for the 1-bit discharge data. That is, the mask data conversion unit 8 performs processing using a mask corresponding to each scan, generating discharge data for each scan when completing printing by multiple scans by a printhead 10 in a scan region (to be referred to as a "band" hereinafter) having a predetermined width in the sub-scanning direction. The mask for use is determined for each pixel in accordance with the print control information added by the print data generation unit 6.

C, M, Y, and K discharge data generated for each scan by the mask data conversion unit 8 are sent to a head driving circuit 9 at a proper timing. The head driving circuit 9 drives the printhead 10 so as to discharge each ink in accordance with the discharge data.

The dot layout patterning processing and mask data conversion processing in the printer 102 are executed by a dedicated hardware circuit under the control of a CPU which constitutes the control unit of the printer 102. These processes may also be performed by the CPU of the printer 102 in accordance with programs, or by, e.g., the printer driver 11 of the host apparatus 101. In the first embodiment, the host apparatus 101 shown in FIG. 2 is not limited to a computer. For example, the printer 102 can also execute each process of the host apparatus 101.

In the first embodiment, the "pixel" means a minimum unit capable of tone expression, and a minimum unit subjected to multi-valued data image processing, and the above-described color matching, color separation, gamma correction, and halftoning. One pixel subjected to the dot layout patterning unit 7 corresponds to a pattern of 4×4 squares, and each square in one pixel is called an area. The area is a minimum unit capable of defining the ON/OFF state of a dot. In association with this, "image data" in color matching, color separation, and gamma correction means a set of pixels to be processed, and each pixel is data having, e.g., an 8-bit tone value. "Pixel data" in halftoning represents pixel data itself to be processed. By halftoning, the 8-bit pixel data is converted into pixel data (index data) having a 4-bit tone value.

Color Separation Processing

Color separation processing executed by the color separation unit 3 in the printer driver 11 of the host apparatus 101 will be explained in detail.

FIG. 3 is a view showing the concept of the 3D LUT looked up by the color separation unit 3. The 3D LUT is formed to slice the RGB space. The color separation unit 3 reads out C, M, Y, and K data at a lattice point corresponding to R, G, and B input values in the 3D LUT as shown in FIG. 3, interpolates them, and converts the R, G, and B input data into C, M, Y, and K color-separated data. In other words, FIG. 3 shows part of the 3D LUT for color-converting R, G, and B data into C, M, Y, and K data.

FIG. 4 shows the amounts of use of C, M, Y, and K printing materials in the C hue as an example of color separation in the first embodiment. The ordinate axis in FIG. 4 represents an 8-bit signal level corresponding to the amount of printing material use (e.g., amount of ink application).

The first embodiment adopts pigment ink. The C pigment of this ink has relatively high glossiness, and the K pigment has relatively low glossiness. Inks of respective colors ideally have the same glossiness. However, as a result of giving priority to other image quality factors such as color gamut, the first embodiment employs a set of inks different in glossiness.

FIG. 5 is a graph showing a gloss characteristic value corresponding to the example of color separation shown in FIG. 4. At each lattice point of the 3D LUT shown in FIG. 3, gloss characteristic value data representing a combination of inks is stored together with color-separated data which implement the characteristics shown in FIG. 4. As for the gloss characteristic value data, similar to C, M, Y, and K data, R, G, and B input data are converted into gloss characteristic value data by reading out values at a lattice point corresponding to R, G, and B values and interpolating them.

The gloss characteristic value in the first embodiment is obtained by printing a common mask pattern on a target print medium with a combination of inks, and converting the 20° specular glossiness into 8-bit data. As the gloss characteristic value becomes larger, the glossiness becomes higher. The gloss characteristic value determination method shown in FIG. 5 is merely an example. The gloss characteristic value may also be determined by another calculation method as long as the gloss characteristic value is correlated to the specular glossiness depending on color separation and the print medium.

Generation of color-separated data and acquisition of the gloss characteristic value can also be achieved by a method other than one using the 3D LUT as shown in FIG. 3. For example, color-separated data may also be calculated by executing an operation complying with an equation representing the above-described conversion for R, G, and B input data. Similarly, the gloss characteristic value may also be calculated on the basis of the characteristics and use ratio of inks.

Generation of Print Data

Print data generation processing executed by the print data generation unit 6 in the printer driver 11 of the host apparatus 101 will be explained in detail.

The print data generation unit 6 selects a mask pattern used for each pixel on the basis of print control designated by the application program 1 and a gloss characteristic value read out by the color separation unit 3. A case where glossy paper is selected as a print medium and 4-pass printing is selected will be exemplified.

Figure 6A:
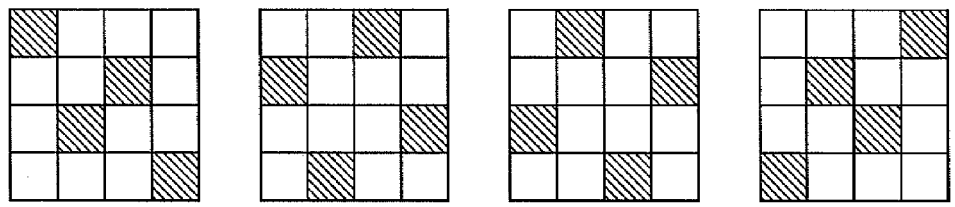
FIG. 6A is a view showing an example of a mask pattern a applied to high-glossiness printing in the embodiment.
Figure 6B:
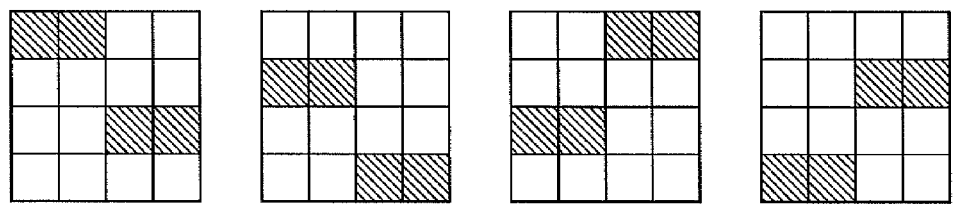
FIG. 6B is a view showing an example of a mask pattern b applied to average-glossiness printing in the embodiment.
Figure 6C:
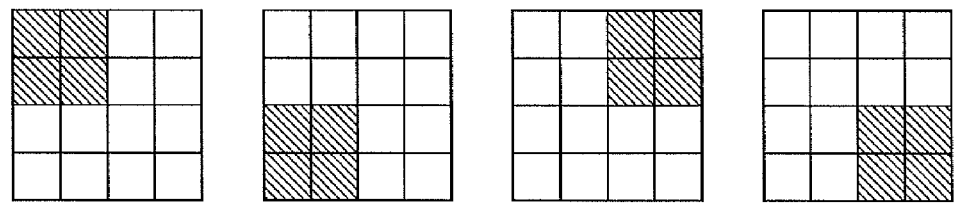
FIG. 6C is a view showing an example of a mask pattern c applied to low-glossiness printing in the embodiment.

FIGS. 6A, 6B, and 6C are views showing three types of mask patterns used in 4-pass printing in the first embodiment. Each square in the mask pattern represents one area where one ink dot is printed. In FIGS. 6A to 6C, mask pattern examples each having 4×4=16 areas are illustrated. In actual printing, a combination of mask patterns each having 4×4 squares is repetitively applied in the vertical and horizontal directions. These mask patterns are stored in the internal memory (not shown) of the printer 102. The mask data conversion unit 8 applies the mask patterns to actual image data. The print data generation unit 6 selects a 2-bit ID number representing a mask pattern to be applied to each pixel, and adds it as print control information to print data.

FIG. 6A shows mask pattern examples applied to a combination of inks for increasing glossiness. These mask pattern examples will be called a mask pattern a. As the mask pattern a, the first to fourth mask patterns are set so as to increase the degree of dot dispersion in each pass using a 1×1 area as a unit area. In actual print scan, print data thinned out in accordance with a mask pattern for the first pass is printed by the first print scan. By the second, third, and fourth print scans, print data thinned out in accordance with corresponding mask patterns are printed. As shown in FIG. 6A, the first to fourth mask patterns used in the first to fourth passes are complementary to each other. Thus, in the same image region on a print medium, all image data are printed by four print scans.

FIG. 6B shows mask pattern examples applied to a combination of inks for obtaining average glossiness. These mask pattern examples will be called a mask pattern b. According to the mask pattern b, two dots are printed next to each other in each pass using a 2×1 area as a unit area.

FIG. 6C shows mask pattern examples applied to a combination of inks for decreasing glossiness. These mask pattern examples will be called a mask pattern c. As the mask pattern c, the first to fourth mask patterns are set so as to decrease the degree of dot dispersion in each pass using a 2×2 area as a unit area. Thus, four dots are printed next to each other.

Figure 7A:
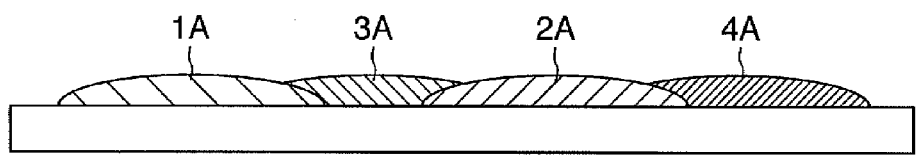
Figure 7B:
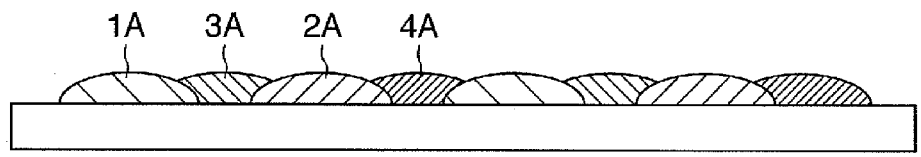
FIG. 7B is a sectional view showing an ink deposition state on a print medium by printing using the mask pattern c.

FIGS. 7A and 7B are sectional views schematically showing ink deposition states when images are formed on print media using the mask patterns a, b, and c. FIG. 7A shows an ink deposition state when 4-pass printing is done according to the mask pattern a. FIG. 7B shows an ink deposition state when 4-pass printing is done according to the mask pattern c. In FIGS. 7A and 7B, 1A to 4A represent dots printed by print scans for the first to fourth passes, similarly to FIG. 1. It is apparent from FIGS. 7A and 7B that an ink applied by preceding print scan is deposited on a print medium but fixes on a lower layer, and the smoothness of the surface of the print medium changes depending on an applied mask pattern.

By selecting a mask pattern in accordance with the gloss characteristic of an ink combination, the smoothness of a target pixel can be changed to control glossiness.

Figure 8:
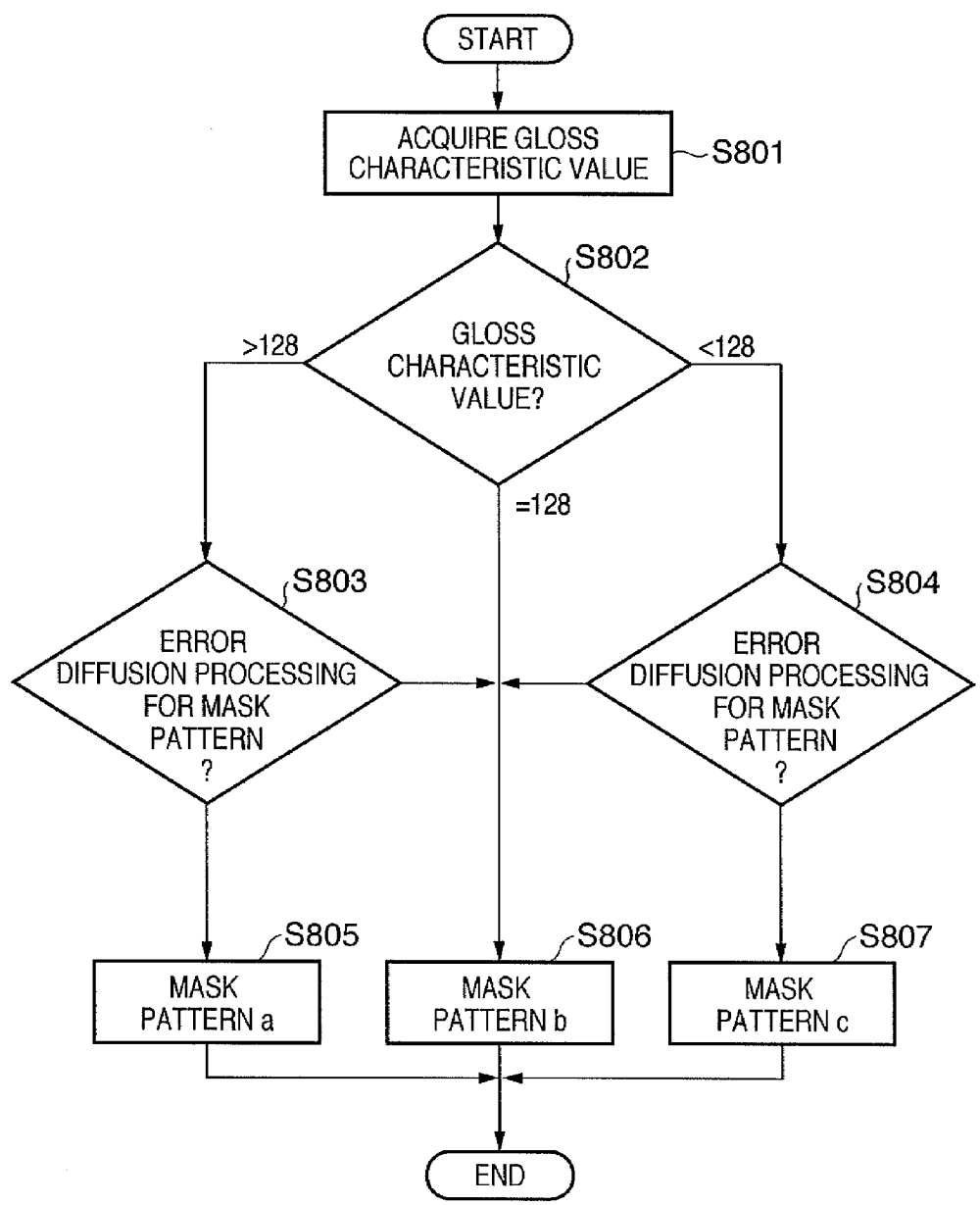
FIG. 8 is a flowchart showing mask pattern selection processing in the embodiment.

Mask pattern selection processing according to the first embodiment will be described in detail with reference to the flowchart of FIG. 8.

In the first embodiment, in advance, a pixel corresponding to a gloss characteristic value of 128 is printed using the mask pattern b, and then the glossiness of the printed pixel is set as a target gloss value.

The gloss characteristic value of a pixel to be printed that is obtained by the color separation unit 3 is acquired (S801), and compared with the target gloss value (S802). If the gloss characteristic value is larger than the target gloss value as a result of comparison, the process proceeds to step S803 in order to use the mask pattern a. If the gloss characteristic value is smaller than the target gloss value, the process proceeds to step S804 in order to use the mask patter c.

In the first embodiment, the glossiness after printing is adjusted close to the target gloss value by applying a plurality of mask patterns in accordance with the gloss characteristic value of an image region to be printed. For this purpose, in step S803, the mask patterns a and b are combined at a ratio corresponding to the gloss characteristic value using, e.g., error diffusion method, and laid out on a target pixel and peripheral pixels (S805 and S806). The combination layout method is not limited to error diffusion method, and mask patterns may also be combined using another method such as dithering.

Also in step S804, the mask patterns b and c are combined at a ratio corresponding to the gloss characteristic value using, e.g., error diffusion method, and laid out on a target pixel and peripheral pixels (S806 and S807).

If the gloss characteristic value is equal to the target gloss value as a result of comparison in step S802, the process proceeds to step S806 in order to use only the mask pattern b.

According to the first embodiment, a target gloss value is obtained by selecting and laying out a mask pattern in accordance with the gloss characteristic value, as described above.

In the first embodiment, printing is done in an image region having a large gloss characteristic value by applying the mask pattern a not only to a C ink having relatively high glossiness in the single color, but also to a K ink having low glossiness and M and Y inks having average glossiness. Similarly in an image region having a small gloss characteristic value, the mask pattern c is applied to all inks regardless of the gloss characteristic in a single color. It is also possible to apply the mask pattern a to only the ink, e.g. the C ink, having relatively high glossiness in an image region having a large gloss characteristic value, and apply the mask pattern c to only the ink, e.g. the K ink, having relatively low glossiness in an image region having a small gloss characteristic value.

When mat paper is selected as a print medium, no problem is considered to arise for the glossiness of a printed portion. In the first embodiment, therefore, the mask pattern a with high degree of dispersion is applied to all pixels, similar to conventional printing.

In the first embodiment, a combination of three types of mask patterns is used. However, a combination of a larger number of types of mask patterns or a combination of two types of mask patterns is also available. That is, the number of types of mask patterns is arbitrary as long as the glossiness in the image region can be controlled.

As described above, according to the first embodiment, a mask pattern in which the degree of dot dispersion changes in each pass is selected and applied to each pixel on the basis of a gloss characteristic corresponding to a combination of inks. As a result, smoothness on the surface of a print medium upon ink deposition can be controlled, and preferable glossiness can be obtained by making the glossiness of an image uniform and suppressing gloss unevenness.

Other Embodiments

The embodiment has been described in detail. The present invention can take embodiments of a system, apparatus, method, program, storage medium (recoding medium), and the like. More specifically, the present invention may also be applied to a system including a plurality of devices (e.g., a host computer, interface device, image capturing apparatus, and Web application), or an apparatus formed by a single device.

The present invention is also achieved by supplying a software program for implementing the functions of the above-described embodiment to a system or apparatus directly or from a remote place, and reading out and executing the supplied program codes by the computer of the system or apparatus. In this case, the program includes a program corresponding to the flowchart shown in the drawing in the embodiment.

Hence, the program codes installed in the computer to implement functional processing of the present invention by the computer also implement the present invention. That is, the present invention also includes the computer program for implementing functional processing of the present invention.

In this case, the program may take the form of an object code, a program executed by an interpreter, or script data supplied to an OS as long as the functions of the program can be provided.

The recording medium for supplying the program includes a Floppy® disk, hard disk, optical disk, magneto-optical disk, MO, CD-ROM, CD-R, CD-RW, magnetic tape, nonvolatile memory card, ROM, and DVD (DVD-ROM and DVD-R).

The program can also be supplied by the following method. More specifically, a client computer connects to an Internet homepage via the browser of the client computer, and downloads the computer program of the present invention (or a compressed file containing an automatic installing function) from the homepage to a recording medium such as a hard disk. The program can also be supplied by dividing program codes which form the program of the present invention into a plurality of files, and downloading the files from different homepages. That is, the present invention also includes a WWW server which allows a plurality of users to download the program files for implementing functional processing of the present invention by a computer.

It is also possible to encrypt the program of the present invention, store the encrypted program in a storage medium such as a CD-ROM, and distribute the storage medium to users. In this case, a user who satisfies a predetermined condition can download decryption key information from a homepage via the Internet. The user can execute the encrypted program by using the key information, and install it in a computer.

Further, the functions of the above-described embodiment are implemented when the computer executes the readout program. The functions of the above-described embodiment can also be implemented when an OS or the like running on the computer performs part or all of actual processing on the basis of the instructions of the program.

The functions of the above-described embodiment are also implemented when the program read out from the recording medium is executed after written in the memory of a function expansion board inserted into the computer or the memory of a function expansion unit connected to the computer. That is, the CPU of the function expansion board or function expansion unit can perform part or all of actual processing on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-353179 filed Dec. 27, 2006, which is hereby incorporated by reference herein in its entirety.

What is claimed is:

1. An image forming apparatus for performing multiple print scans in an identical image region using a color material containing pigment comprising:
   an acquisition unit adapted to acquire a gloss value corresponding to a colorant used to perform the multiple print scans in the image region;
   a selection unit adapted to select mask patterns used in the multiple print scans on the basis of the gloss value, wherein a mask pattern of interest used in a print scan of interest is for determining dots to be printed by the print scan of interest among all dots to be printed in the image region by the multiple print scans, and wherein a degree of dispersion of dots determined by the mask pattern of interest is different from a degree of dispersion of dots determined by another mask pattern; and
   an image forming unit adapted to perform the multiple print scans, each for printing dots determined by the mask pattern in the image region.

2. The apparatus according to claim 1, wherein said selection unit selects a high-dispersion mask pattern which increases the degree of dispersion of dots when the gloss value is larger than a predetermined threshold value, and selects a low-dispersion mask pattern which decreases the degree of dispersion of dots when the gloss value is smaller than the predetermined threshold value.

3. The apparatus according to claim 2, further comprising a mask pattern storage unit adapted to store sets of mask patterns complementary to each other,
   wherein said selection unit selects, as the high-dispersion mask pattern or the low-dispersion mask pattern, one set from the sets of mask patterns stored in said mask pattern storage unit, and said image forming unit switches mask patterns of the mask pattern set every scan to perform the multiple print scans.

4. The apparatus according to claim 3, wherein said mask pattern storage unit stores a first mask pattern set which increases the degree of dispersion of dots, a second mask pattern set which decreases the degree of dispersion of dots, and a third mask pattern set which is middle between the first mask pattern set and the second mask pattern set, and
   said selection unit selects the first mask pattern set and the third mask pattern set from the sets of mask patterns stored in said mask pattern storage unit and combines them as the high-dispersion mask pattern, or selects the second mask pattern set and the third mask pattern set from the sets of mask patterns stored in said mask pattern storage unit and combines them as the low-dispersion mask pattern.

5. The apparatus according to claim 4, wherein said image forming unit uses two sets of mask patterns selected from said mask pattern storage unit to perform the multiple print scans in the image region to be printed by said image forming unit by using error diffusion method.

6. The apparatus according to claim 4, wherein the first mask pattern set is a mask pattern set in which printed dots do not lie next to each other when said image forming unit performs print scan using mask patterns of the set.

7. The apparatus according to claim 4, wherein the second mask pattern set is a mask pattern set in which at least two printed dots lie next to each other when said image forming unit performs print scan using mask patterns of the set.

8. The apparatus according to claim 2, wherein said selection unit selects the high-dispersion mask pattern or the low-dispersion mask pattern for all colorants used to print in the image region to be printed by said image forming unit.

9. The apparatus according to claim 1, further comprising a holding unit adapted to hold a combination of colorants for reproducing a pixel value and a gloss value corresponding to the combination, wherein said acquisition unit acquires the gloss value held by said holding unit in accordance with the combination of colorants used to print in the image region to be printed by said image forming unit.

10. A computer-readable recording medium for recording a program which runs on a computer to cause the computer to function as the acquisition unit, the determination unit, and the image forming unit in an image forming apparatus defined in claim 1.

11. A method of controlling an image forming apparatus for performing multiple print scans in an identical region using a color material containing pigment, the method comprising the steps of:

acquiring a gloss value corresponding to a colorant used to perform the multiple print scans in the image region;

selecting mask patterns used in the multiple print scans on the basis of the gloss value, wherein a mask pattern of interest used in a print scan of interest is for determining dots to be printed by the print scan of interest among all dots to be printed in the image region by the multiple print scans, and wherein a degree of dispersion of dots determined by the mask pattern of interest is different from a degree of dispersion of dots determined by another mask pattern; and performing the multiple print scans, each for printing dots determined by the mask pattern in the image region.

\* \* \* \* \*